United States Patent [19]

Kumazawa et al.

[11] Patent Number: 4,558,695
[45] Date of Patent: Dec. 17, 1985

[54] METHOD OF MANUFACTURING A HEAT EXCHANGER

[75] Inventors: Takahiro Kumazawa, Anjo; Yoshihiro Nakamura, Tokoname; Toshihisa Izawa, Toyota, all of Japan

[73] Assignee: Nippondenso Co., Ltd., Kariya, Japan

[21] Appl. No.: 508,532

[22] Filed: Jun. 28, 1983

[30] Foreign Application Priority Data

Jul. 2, 1982 [JP] Japan .................................. 57-115669

[51] Int. Cl.⁴ .......................... B23P 15/26; B22C 13/10
[52] U.S. Cl. .................................. 228/183; 29/157.3 B; 29/527.6; 29/157.4; 228/155; 228/158; 228/159; 228/160; 228/173.4; 228/173.7; 165/151; 165/182; 165/177
[58] Field of Search ..................... 29/157.3 C, 157.3 B, 29/157.3 R, 157.3 A, 157.3 D, 527.6, 157.4, 423; 228/183, 155, 158, 159, 160, 173.1, 173.2, 173.3, 173.4, 173.5, 173.6, 173.7; 165/177, 182, 151

[56] References Cited

U.S. PATENT DOCUMENTS

| | | | |
|---|---|---|---|
| 858,258 | 6/1907 | Briscoe et al. | 165/151 |
| 1,502,301 | 7/1924 | Fedders | 165/151 |
| 1,942,560 | 1/1934 | Lithman | 165/151 |
| 2,009,863 | 7/1935 | Trane | 29/157.4 |
| 2,215,933 | 9/1940 | Offult | 228/159 |
| 3,266,567 | 8/1966 | Oddy et al. | 165/182 X |
| 3,337,944 | 8/1967 | Morris | 228/160 |
| 3,472,316 | 10/1969 | Couch, Jr. | 29/157.3 B |
| 3,603,384 | 9/1971 | Huggins et al. | 165/151 |
| 3,986,654 | 10/1976 | Hart | 228/155 |
| 4,269,267 | 5/1981 | Labrande | 165/181 |

FOREIGN PATENT DOCUMENTS 3323622 1/1984 Fed. Rep. of Germany ...... 228/183

Primary Examiner—Howard N. Goldberg
Assistant Examiner—Vernon K. Rising
Attorney, Agent, or Firm—Cushman, Darby & Cushman

[57] ABSTRACT

A heat exchanger such as a radiator for an automotive engine is produced by fixing lengths of flattened tubes and corrugated fins to each other by brazing within a furnace. The flattened tube is formed by bending a strip and welding the opposing edges of the bent strip to each other to form a tube of a substantially circular cross-section, and applying pressure to the tube along the weld line to form the flattened tube while depressing the tube wall along the weld line to form an elongated recess or groove along the weld line. Then, a brazing material is applied to the outer surfaces of the flattened tube to cover and fill up any minute weld defects which may exist in the flattened tube whereby the weld defects are repaired.

3 Claims, 12 Drawing Figures

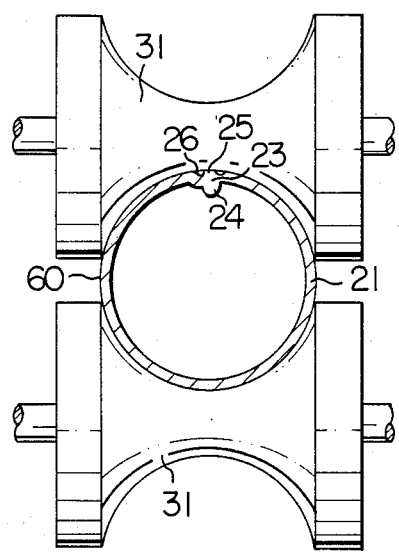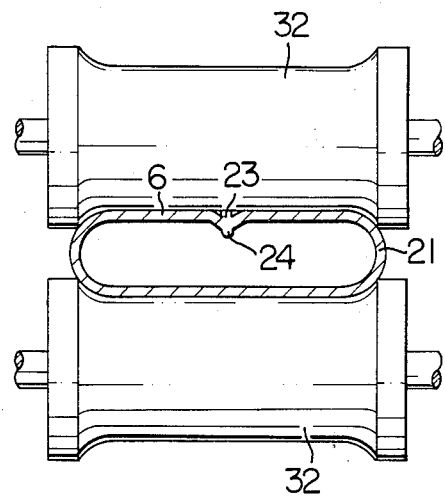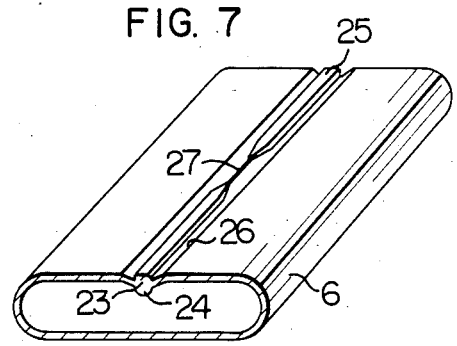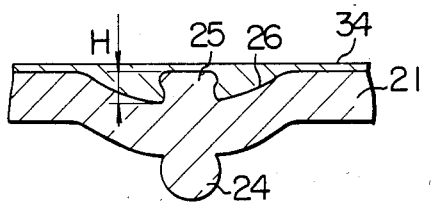

METHOD OF MANUFACTURING A HEAT EXCHANGER

BACKGROUND OF THE INVENTION

The present invention relates to a heat exchanger and method of manufacture thereof suited for use, for example, in the production of radiators for automotive engines.

DESCRIPTION OF THE PRIOR ART

A typical conventional method of producing heat exchangers employs the steps of forming circular tubes by bending strips into a circular form and then welding the opposing edges of each strip, pressing the circular tubes to form flattened tubes, and brazing the flattened tubes and separately prepared corrugated fins by placing the flattened tubes in contact with the corrugated fins within a furnace. In this known method, however, even a slight weld defect produced during welding of the opposing edges of the strip leads to a problem which is vital in the heat exchanger, i.e., a leak of the fluid from the tube. To eliminate this problem, it has been necessary to conduct an examination for detecting any inferior gas-tightness along the weld line of each circular tube. Such examination, however, is quite invalid for detecting minute weld defects of as short as less than 2 mm because the circular tubes are formed continuously at a high speed of 100 m per minute or higher in the known method explained above. Thus, it is not possible to satisfactorily eliminate minute weld defects in the circular tubes.

It is true that such weld defects are repaired to some extent by the brazing material which flows to and collects at the weld defects to fill up the defects during brazing of the flattened tubes to the corrugated fins. This reparation of weld defects by the brazing material, however, is not considered to be a positive measure for repairing the weld defects because the filling of the brazing material is quite uncertain and dependent on unexpected chances. In addition, the tubes having defects filled with brazing material could not stand long use because the brazing material formed a thin covering layer.

SUMMARY OF THE INVENTION

Accordingly, an object of the invention is to provide an improved method of producing a heat exchanger which is effective to make sure that weld defects are positively and reliably repaired by brazing material.

According to the present invention, there is provided a method of producing a heat exchanger comprising: a first step of bending a strip and welding the opposing edges of the thus bent strip to form a tube having a substantially circular cross-section; a second step of pressing and flattening the tube to form a flattened tube while depressing the wall of the tube slightly inwardly along the weld line; a third step of applying a brazing material to the outer surface of the flattened tube; and a fourth step of assembling the thus flattened tube and a corrugated fin with each other and brazing the thus assembled flattened tube and the corrugated fin together.

The above and other objects, features and advantages of the invention will be made clear by the following description of the preferred embodiments with reference to the accompanying drawings.

Another object of the invention is to provide a heat exchanger having improved mechanical strength and durability.

BRIEF DESCRIPTION OF THE DRAWINGS

FIGS. 5 and 6 are cross-sectional views of the circular tube which is being processed by a second step of the method of the invention;

FIG. 7 is a perspective view of the flattened tube shown in FIG. 6;

FIGS. 8 and 9 are fragmentary sectional views of the flattened tube which is being processed by a third step of the method of the invention;

DESCRIPTION OF PREFERRED EMBODIMENTS

Figure 1:
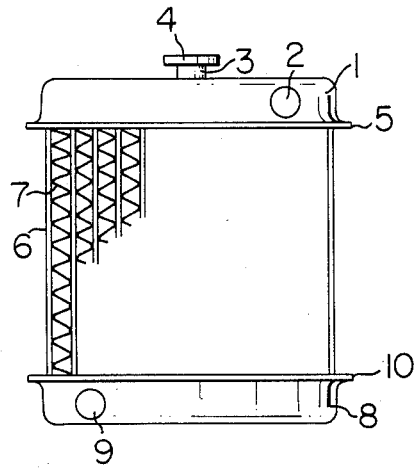
FIG. 1 is a front elevational view of a heat exchanger produced by a method in accordance with the invention.
Figure 2:
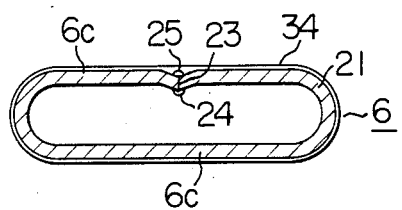
FIG. 2 is an enlarged cross-sectional view of a flattened tube incorporated in the heat exchanger shown in FIG. 1.

FIG. 1 shows a corrugated fin type radiator for an automotive engine. The radiator has an upper tank 1 provided with a coolant inlet pipe 2 through which a coolant heated by the engine (not shown) is introduced, and with a coolant filling port 3 which is normally closed by a cap 4. An upper core plate 5 is brazed to the upper tank 1 in a gas-tight manner. The radiator has a plurality of flattened tubes 6 each of which is formed by bending a brass strip of a thickness less than 0.15 mm into circular form, welding opposing edges of the thus bent strip to form a tube having a circular cross-section, and then pressing the circular tube into flattened form. The flattened tubes 6 are connected at their upper and lower ends to the upper core plate 5 and a lower core plate 10, respectively, in a gas-tight manner by brazing or the like measure so that the tubes have their upper and lower ends open in the upper core plate 5 and the lower core plate 10. The radiator further has corrugated fins 7 which are fixed by brazing to the flat surfaces 6c (see FIG. 2) of adjacent flattened tubes 6 thereby to increase the heat radiation from the flattened tubes 6. The radiator further has a lower tank 8 provided with a coolant outlet pipe 9 leading to the engine. The lower core plate 10 mentioned above is fixed by brazing to the lower tank 8 in a gas-tight manner.

The operation of the corrugated fin type radiator having the described construction is as follows:

The coolant circulated through and heated by the engine is introduced into the upper tank 1 through the coolant inlet pipe 2 and is distributed evenly to all flattened tubes 6. The coolant then flows down along the flattened tubes 6 while transmitting heat to the walls of the flattened tubes and corrugated fins 7 attached thereto. The heat is then carried away from the tubes 6 and the fins 7 by cooling air which is forcibly moved across the radiator by a radiator fan (not shown). The coolant thus cooled in the flattened tubes 6 is then introduced into the lower tank 8 and is returned to the engine through the coolant outlet pipe 9 thereby to cool the engine.

Figure 3:
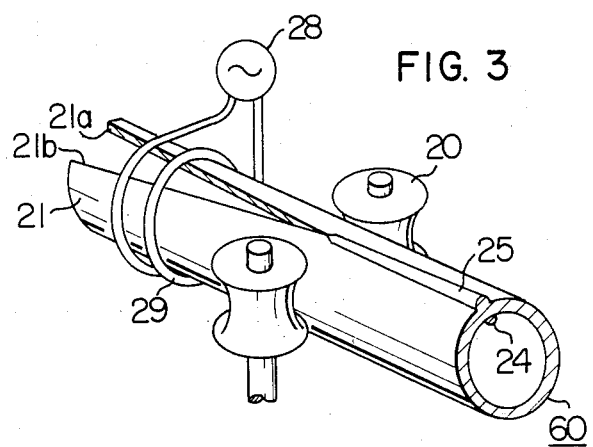
FIG. 3 is a perspective view of a circular tube which is being made by a first step of the method of the invention.

According to the invention, this radiator is produced by a method which will be explained hereinunder. Referring to FIG. 3 illustrating a first step of the method for producing the radiator, a continuous brass strip 21 of a thickness less than 0.15 mm is bent about its longitudinal axis into a substantially circular form by means of rollers which are not shown. The opposing edges 21a and 21b of the thus bent strip are then heated by means of an induction heating coil 29 which is energized by a radio frequency weld generator 28. Subsequently, the bent strip is caused to pass through a nip of a pair of squeeze rolls 20 so that the heated opposing edges are pressed together and welded to each other to form a tube 60 having a substantially circular cross-section, as illustrated. Thus, weld beads 24 and 25 are formed on the inner and outer surfaces of the circular tube 60 along the weld line, as will be best seen in FIG. 4.

The circular tube 60 is then subjected to a flaw detection which is conducted by the use of an eddy current testing apparatus (not shown) to detect any weld defect. If any defect is found, the circular tube having such defect is rejected after a third step which will be explained later.

Figure 4:
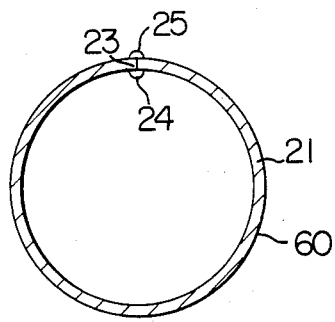
FIG. 4 is a cross-sectional view of the circular tube shown in FIG. 3.

The circular tube 60 is then subjected to a second step of the method. The second step includes two sub-steps; namely, a first sub-step and a second sub-step. In the first sub-step, the weld bead 25 on the outer surface of the circular tube 60 shown in FIG. 4 is trimmed by a cutter (not shown) so that the bead 25 on the tube surface now has a predetermined height H. This trimming is conducted because a too large height of the bead produces a large gap between the flattened tube and associated corrugated fins to undesirably impair the heat transfer from the tube to the fin. Too large height H of projection is not preferred also for the reason that such too large height produces an excessive deformation of the strip 21. Thus, the height H of the bead 25 is preferably selected to fall within a range between a value equal to the thickness of the strip 21 and a value which is approximately one third (⅓) the strip thickness.

Then, the second sub-step is taken in which, as shown in FIG. 5, the circular tube 60 is shaped by shaping rolls 31 to have a substantially exactly circular outer surface, so that the wall of the circular tube 60 is shaped by shaping rolls 31 to have a substantially exactly circular outer surface, whereby the wall of the circular tube 60 is depressed along the weld line 23 to form linear recesses or grooves 26. It will be understood that the depth of the grooves 26 is substantially equal to the height H of the weld bead 25. Then, in the later part of the second sub-step, the circular tube 60 is caused to pass through nips of a plurality of pairs of flattening rolls 32 so that the circular tube 60 is progressively flattened into the shape shown in FIG. 6, thus completing the second step. The shapes of the successive flattening roll pairs are gradually varied to assure that the tube to be flattened is gradually deformed from the circular cross-sectional shape first into an elliptical one and finally into the flattened cross-sectional shape having two substantially flat surfaces. In the flattened tube 6 obtained through the second step, the wall of the tube has been depressed along the weld line 23 to leave the grooves 26 in one of the flat outer surfaces of the tube, as will be seen in FIG. 7 in which a weld defect is designated by reference numeral 27.

As explained before, a flaw detection is made by an eddy current testing apparatus along the weld line 23 after the welding has been conducted in the first step. This flaw detection, however, often fails to detect minute flaws each as short as less than 2 mm because the welding is conducted at a high speed exceeding 100 m per minute. In consequence, such minute flaw may be overlooked and remain in the flattened tube 6. In other words, any weld defect 27, which could not be detected by the eddy current tester, necessarily has a small length of as short as less than 2 mm and, hence, does not impair the formation of the grooves 26.

Figure 9:
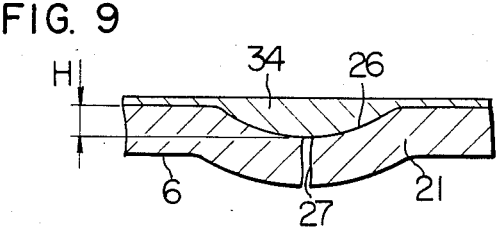

Then, a third step is taken in which the flattened tube 6 is caused to pass through a bath of molten solder so that the flat surface of the tube having the grooves 26 therein is directed upwardly, with a result that a deposit of solder 34 as the brazing material stays in the grooves 26 without fail, as shown in FIGS. 8 and 9. In consequence, the solder 34 covers and fills up the weld defect 27 to repair or close the same.

The first to third steps are conducted consecutively and, after the third step has been completed, the flattened tube is cut into pieces of desired lengths, e.g., 40 cm. Any piece of the flattened tube which has a weld defect 27 detected by the flaw detection is rejected after the third step. Thus, no piece of the flatened tube 6 having a weld defect 27 of longer than 2 mm is forwarded from the third step to a fourth step which is conducted in a manner described hereinbelow.

In the fourth step, a plurality of pieces of the flattened tube 6 are assembled with separately prepared corrugated fins 7 such that each fin is positioned between an adjacent pair of flattened tube pieces 6. This assembly is further assembled with core plates 5 and 10 attached to the upper and lower ends of the thus assembled flattened tube pieces 6 to form a heat exchanger core which is further assembled with tanks 1 and 8 to form a unit. The unit is then placed in a furnace (not shown) in which the flattened tube pieces 6, the corrugated fins 7, the core plates 5 and 10 and the tanks 1 and 8 are heated to a temperature of about 300° C. so that these component parts are permanently and rigidly united by soldering. After the soldering, therefore, the flattened tube pieces 6 and the corrugated fins 7 are thermally and mechanically connected to each other by the solder 34 disposed therebetween. In this state, the solder 34 fills up the grooves 26 in each tube piece to reliably reinforce the weld line 23 as well.

In addition, according to the method of the invention, the solder layer 34 is of a small thickness because the depth of the grooves 26, which corresponds to the aforementioned height H, is very small. Thus, the transfer of heat from the flattened tube pieces 6 to the corrugated fins is not impaired by the presence of the solder layer 34 therebetween. It is to be noted also that this advantageous effect can be obtained without substantial increase of the consumption of the solder 34 because the grooves 26 are of very limited area.

Figure 10:
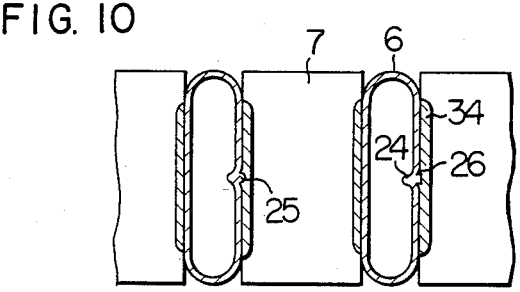
FIG. 10 shows, partly in cross-section, the flattened tubes and corrugated fins secured to the tubes by a fourth step of the method of the invention.

Furthermore, according to the method of the invention, the weld line 23 of each piece of the flatened tube 6 is reinforced also by the corrugated fins 7 because the weld line 23 exists in one of the flattened surfaces of the tube piece as will be seen in FIG. 10. It is, therefore, possible to obtain sufficiently high mechanical strength and durability of the radiator partly because the weld defect of a size less than 2 mm, if any, is covered satisfactorily by the solder layer 34 filling the grooves 26 and partly because the weld line 23 is conveniently reinforced by the corrugated fins 7.

Figure 11:
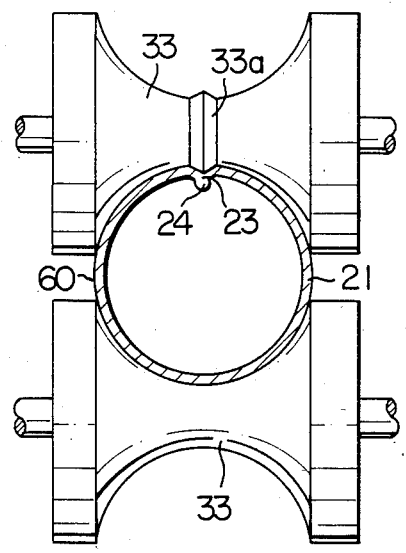
FIG. 11 is a cross-sectional view of a circular tube which is being processed by a modified second step.
Figure 12:
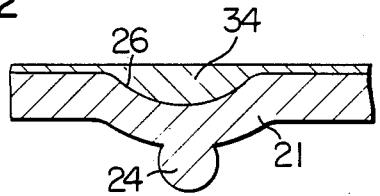
FIG. 12 is a fragmentary sectional view of a flattened tube which is being processed by a modified third step.

In the embodiment described above, the depression of the wall of the circular tube 60 along the weld line 23 is effected by making a positive use in the second step of the weld bead 25 on the outer surface of the tube. This, however, is not exclusive and the second step in the method of the invention can alternatively be conducted in the following manner: Namely, the whole part of the weld bead 25 projecting from the outer surface of the circular tube 21 is cut and removed in the first sub-step and then the second sub-step is conducted employing a shaping roll 33 having a central annular projection 33a as shown in FIG. 11 to depress the tube surface along the weld line 23. Consequently, a cross-section of weld part as shown in FIG. 12 is obtained after the tube is flattened and the same advantageous effects are atained as those offered by the embodiment explained in connection with FIGS. 1 to 10. The shaping roll 33 having the central annular projection 33a may be used either in shaping the circular tube or in flattening the tube or even in both of the shaping and flattening of the tube. Although the central projection 33a of the illustrated roll 33 has a triangular cross-section, the central projection 33a can have other cross-sectional shape such as trapezoidal shape.

In the described embodiment, brass and copper are used as the materials of the flattened tube 6 and the corrugated fins 7, although other metallic materials, such as aluminum, can be used as the materials of the tube and the fins.

In order that all parts of the radiator, i.e., the tanks 1 and 8, the core plates 5 and 10, the pieces of flattened tube 6 and the corrugated fins 7, may be bonded and integrated at once by brazing in the furnace, the tanks 1 and 8 should be made of a metallic material. This, however, is not exclusive and the tanks 1 and 8 may alternatively be made from a synthetic resin reinforced with, for example, glass fibers. In such an alternative case, the core plates 5 and 10 are fixed by caulking to the tanks 1 and 8.

Although the invention has been described with specific reference to an automotive engine radiator, it is to be understood that the method of the invention can also be applied to the production of other various kinds of heat exchangers, such as an air heating heater core for automotive air conditioner.

As has been described, according to the invention, it is possible to prevent leakage of liquid from the flattened tube pieces without fail, due to the intentional and positive use of the brazing material in the repair of any weld defects which may exist in the weld portions of the flatened tube pieces.

From the foregoing description, it will be understood that the present invention makes it possible to produce a heat exhcanger having an improved quality.

What is claimed is:

1. A method of producing a heat exchanger comprising: a first step of bending a strip and welding the opposing edges of the thus bent strip to form a tube having a substantially circular cross-section; a second step of pressing and flattening said tube to form a flattened tube while depressing the wall of the tube slightly inwardly along the weld line; a third step of applying a brazing material to the outer surface of said flattened tube; and a fourth step of assembling said flattened tube and a corrugated fin with each other and brazing the thus assembled flattened tube and said corrugated fin together.

2. A method of producing a heat exchanger according to claim 1, wherein the circular tube formed by the first step has a weld bead projecting radially outwardly from the outer peripheral surface of said circular tube, and wherein said second step includes trimming said weld bead so that the bead thus trimmed has a predetermined height from the outer peripheral surface of said circular tube, and pressing said circular tube along the weld line to form a flattened tube having two substantially flat outer surfaces in one of which said trimmed weld bead extends longitudinally of said tube and an elongated recess is formed along said bead.

3. A method of producing a heat exchanger according to claim 1, wherein the circular tube formed by the first step has a weld bead projecting radially outwardly from the outer peripheral surface of said circular tube, and wherein second step includes substantially completely removing said weld bead from said outer peripheral surface of said circular tube, and inwardly depressing the wall of said tube along said weld line by means of an annular projection of a roll.

* * * * *